Nov. 8, 1960 H. C. KENDALL ET AL 2,959,670
CAB SIGNALING SYSTEM FOR RAILROADS
Filed July 13, 1955
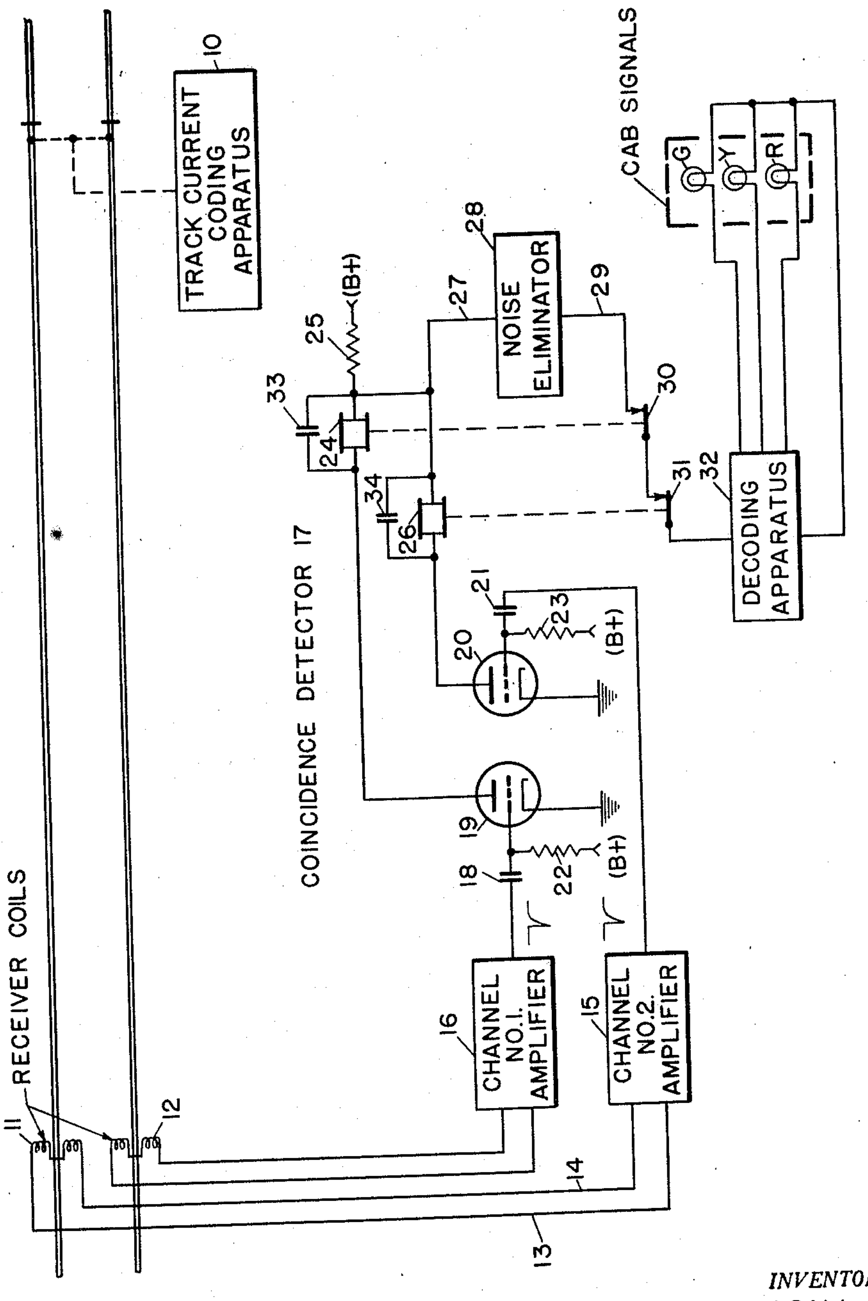
*INVENTORS*
H.C. KENDALL AND
W.K. MAENPAA
*BY* Forest B. Hitchcock
THEIR ATTORNEY United States Patent Office 2,959,670

Patented Nov. 8, 1960

2,959,670

CAB SIGNALING SYSTEM FOR RAILROADS

Hugh C. Kendall and Wilho K. Maenpaa, Rochester, N.Y., assignors to General Railway Signal Company, Rochester, N.Y.

Filed July 13, 1955, Ser. No. 521,710

4 Claims. (Cl. 246—63)

This invention relates to cab signaling systems for railroads and more particularly pertains to an improved coincidence detection circuit organization for a two-channel, cab signal amplifier.

In coded track circuit signal systems, pulses of current are applied to the track rails at the exit end of each track section. Any one of various coding rates for the track pulses can be used dependent upon existing traffic conditions, and the resulting rail pulses are received at the entrance end when the track section is unoccupied and produce intermittent operation of the track relay at that end. The rate of operation of this relay determines the signal aspect displayed to trains entering the track section.

Trains operating over track circuits supplied with such coded rail currents can be provided with continuous inductive cab signaling apparatus so that signal indications can be continually received on the train. To accomplish this, one or more vehicle-carried receiver coils is mounted ahead of the front wheels of the locomotive so that voltages are induced therein by the rail current pulses. The induced voltages are then amplified and from them the coding rate of the rail current is determined and used to distinctively control the cab signals.

A cab signaling system has been developed in which the receiver coils are each tuned to a distinctive frequency different from that of the steady-state rail current likely to be encountered in the track rails. As a result, distinctive transient voltages are induced in the receiver coils having frequency characteristics dependent principally upon the resonant receiver coil frequency rather than the frequency of the "on" periods of the coded rail currents. Substantially the same kind of transient voltages are thus induced in the receiver coils for different frequencies of alternating current comprising the rail current "on" periods and even for those situations where the "on" periods comprise direct current. Consequently, the same amplifying and decoding apparatus may be used without change-over as a vehicle operates over various track sections having these different kinds of coded rail currents. A cab signaling system of this kind is disclosed in the patent No. 2,731,552, issued January 17, 1956 on an application of H. C. Kendall and F. P. Zaffarano, Ser. No. 227,164, filed May 19, 1951 and in the Patent No. 2,731,553, issued January 17, 1956 on an application of F. P. Zaffarano and W. K. Maenpaa, Ser. No. 241,576, filed August 13, 1951.

In the system disclosed in these applications, a distinctive transient voltage is induced in each receiver coil both by the application and the removal of each pulse of rail current. Special amplifier means is associated with each receiver so that the induced transient voltages may be individually amplified. Each amplifier is organized to amplify the distinctive transient. but to attenuate sharply other frequencies such as stray power current frequencies and the steady-state component of the rail current "on" periods. The output of each amplifier then generally comprises a single voltage pulse for each beginning and each end of a track current pulse. The two amplifier outputs are then applied to a coincidence detecting circuit organization that is effective to provide an output only if its two inputs are in coincidence, thereby signifying that the transient voltages were induced simultaneously in both receiver coils. This requirement of coincidence ensures that extraneous outputs cannot be applied to the coding apparatus as a result of stray rail currents, magnetized rail spots, and the like which ordinarily are not able to induce similar voltages simultaneously in both receiver coils.

More specifically, the coded rail currents utilize both tracks to complete a circuit so that each rail pulse travels in one direction down one track rail and in the opposite direction up the other track rail. The two receiver coils are poled to provide inputs of the same polarity to their respective amplifying channels in response to these opposite polarities of track current. Stray track currents, in contrast, generally transverse both rails in the same direction and thus induce voltages in their respective receiver coils which are ineffective to produce outputs of the coincidence detecting means because of their out-of-phase condition as compared to the voltages induced by legitimate code pulses. In a similar way, any other condition tending to cause spurious outputs, such as magnetized rail spots, that ordinarily affect only one receiver at a time are not able to produce outputs from the coincidence detecting means.

It is desirable that the coincidence detecting circuit organization provide an output only for closely coincident inputs to provide thereby the most protection against extraneous, out-of-phase inputs. Also, the coincidence detecting means should preferably be organized to be fail-safe so that any circuit fault is self-revealing and will not permit single channel operation, i.e. operation that results in the generation of an output from the coincidence detecting means when it receives but a single input from one of the amplifier channels.

The coincidence detecting means of this invention has, accordingly, been devised so that any circuit fault such as the opening or grounding of a connection, or the failure of an electron tube, will prevent any output from being supplied to the decoding apparatus. Although this coincidence detection means is particularly applicable to the cab signaling system disclosed in the previously mentioned patent applications, its use is in no way limited to systems of this particular kind. It will be found to have utility for various types of cab signaling systems employing individual amplifier channels for the respective receivers when it is desired that an output be provided only for legitimate coded rail currents affecting both receiver coils simultaneously in the same manner. Furthermore, the coincidence detecting means of this invention will be found to be useful whenever it is desired to detect the coincidence of a plurality of pulses and is not limited to the detection of coincidence between two input pulses but may readily be used to check coincidence for any number of input pulses. Such a coincidence detection means is particularly appropriate for use in the electronic code rate discriminator disclosed in the earlier mentioned Kendall and Zaffarano Patent No. 2,731,552.

Described briefly, the coincidence detecting means comprises two electron discharge tubes when it is desired to detect the coincidence of two separately occurring inputs. Each tube receives on its grid-cathode circuit the output voltage of one of the respective amplifier channels. The plates of both tubes are connected through a common load impedance to a source of direct-current power. Only when both tubes are simultaneously made nonconductive by their respective input pulses does all flow of tube plate current through the common load impedance cease and thereby produce an abrupt variation in voltage across this common load impedance. The plate-cathode circuit of each tube also includes the winding of a relay, and since both tubes are normally conductive, these relays are normally maintained in their picked-up conditions despite the fact that the tubes become momentarily nonconductive in response to their respective input pulses. The output pulse of the coincidence detector is applied through front contacts of these two relays in series to the decoding apparatus. Any failure of the coincidence detector means such as the burning out of one of the tubes results in one or more of the two relays becoming deenergized so that its front contact opens and the output pulses of the coincidence detector then cannot be applied to the decoding apparatus.

An object of this invention is to provide an electronic coincidence detecting circuit organization that is fail-safe by failing to provide an output in the event of any circuit fault.

Another object of this invention is to provide a fail-safe electronic coincidence detecting circuit organization comprising two electron tubes with relay circuit means associated with each tube to check its proper operation.

Other objects, purposes, and characteristic features of this invention will in part be obvious from the drawing and in part pointed out as the description of the invention progresses.

In describing this invention in detail, reference will be made to the accompanying drawing illustrating one form of this invention. In the drawing, the symbol (B+) and the symbol for a ground connection indicate connections to the opposite terminals of a source of power suitable for the operation of electron tubes.

In the drawing, track current coding apparatus 10 is shown as being associated with the track rails at the exit end of a track section. This track current coding apparatus may assume any of several different forms, all of which are well-known in the prior art. Most commonly this apparatus causes pulses of current to be applied at selected code rates to the track rails with the "on" periods of the codes being substantially equal in length to the "off" periods. In practice, the most commonly used code rates for the different traffic conditions are 75, 120, and 180 pulses per minute. The track current may comprise "on" periods of direct current or of alternating current of any suitable frequency such as 100 or 60 cycles per second.

The vehicle-carried equipment includes two receivers 11 and 12, one for each of the track rails. These receivers are so positioned on the locomotive ahead of the front wheels that they can be inductively affected by the changing rail current. Thus, as in the cab signaling system disclosed in the above-mentioned applications, each application and each removal of a code pulse from the track rails results in a transient voltage being induced in both receiver coils simultaneously.

Each receiver supplies its induced voltage over a pair of wires to a corresponding amplifying channel. The voltage induced in receiver 11, for example, is applied over wires 13 and 14 to the channel No. 2 amplifier 15. The voltage induced in the other receiver 12 is similarly applied to the input of channel No. 1 amplifier 16. The induced receiver voltages are individually amplified in these two amplifier channels. Various expedients may be used in these amplifier channels to reduce the effectiveness of extraneous voltages induced in the receiver coils. For example, tuned degenerative circuits, feedback circuit organizations, and other means may be used as particularly disclosed in the above-mentioned Zaffarano and Maenpaa Patent No. 2,731,553 to ensure that the respective amplifier channels provide outputs only for transient voltages induced by the legitimate coded rail current.

Each of the amplifier channels is organized so that it normally provides, in response to each induced transient voltage, a negative-going output pulse. Under certain conditions, as when the track current is of a large amplitude so that correspondingly large amplitude voltages are induced in the receiver coils, more than one output pulse is provided by each amplifier channel for the beginning or end of a track code pulse.

The output pulses of the respective amplifier channels occur in time coincidence only in response to legitimate coded rail currents which are effective to induce similar transient voltages simultaneously in both receivers.

The coincidence detector 17 comprises two electron discharge tubes which may be of the triode type as shown in the drawing. The output of channel No. 1 amplifier 16 is applied through a coupling capacitor 18 to the control grid of tube 19, and the output of the channel No. 2 amplifier 15 is similarly applied to the grid of tube 20 through capacitor 21. The grids of tube 19 and 20 are connected respectively through resistors 22 and 23 to (B+), and both tubes have their cathodes connected directly to ground. The plate of tube 19 is connected through the winding of relay 24 and through load resistor 25 to (B+). The plate of tube 20 is connected in a similar manner through the winding of relay 26 and also through the load resistor 25 to (B+). The output of the coincidence detector 17 is obtained from the left-hand terminal of resistor 25 and is applied over wire 27 to the noise eliminator 28 whose function will later be described. The output of the noise eliminator appearing on wire 29 is applied through front contact 30 of relay 24, and front contact 31 of relay 26, to the decoding apparatus 32. The decoding apparatus 32 detects, from the rate of its input pulses, the coding rate of the track current and controls the cab signals accordingly so that the proper cab signal aspect is displayed to the trainman.

Both tubes 19 and 20 are normally in fully conductive conditions because their control grids are connected through resistors 22 and 23 respectively to the (B+) source. The grid of each tube is essentially at ground potential, however, because any attempt of the grid to rise above ground causes a flow of grid current and a resulting reduction in grid voltage caused by the voltage drop produced across the associated grid resistor. With both tubes 19 and 20 in this conductive condition, there is a substantial flow of current through the windings of relay 24 and 26 so that these relays are normally maintained fully energized and in their picked up conditions. The flow of current through the common plate load resistor 25 produces a substantial voltage drop across this resistor so that the voltage normally appearing on wire 27 is of relatively low value.

When either tube 19 or 20 receives a negative-going pulse from its respective amplifier channel, the voltage at the grid of the tube is driven momentarily negative by a sufficient amount to drive the tube to a cut-off condition. Since the input pulse is preferably of short duration, as diagrammatically illustrated in the drawing, the corresponding tube is cut off for only a relatively short length of time. Since relays 24 and 26 are shunted by capacitors 33 and 34, respectively, these capacitors are normally charged to the voltage level appearing across the associated relay. When either tube 19 or tube 20 becomes momentarily nonconductive in response to its input pulse, the charged capacitor shunting the corresponding relay is effective to discharge its energy into the winding of such relay and thereby hold it in its picked-up condition throughout the time the corresponding tube is nonconductive. In this way, the input pulses to the coincidence detector 17 are normally ineffective with respect to the operated conditions of relays 24 and 26.

When both tubes 19 and 20 become simultaneously cut off in response to simultaneously occurring negative-going input pulses, all flow of tube current through resistor 25 ceases. The voltage on wire 27 then abruptly is raised to the level of the (B+) voltage source with the result that the noise eliminator 28 then receives a positive-going trigger pulse of large amplitude. If the input pulses to the coincidence detector are out of phase, tubes 19 and 20 cannot be simultaneously cut off. There then remains at all times some flow of current through resistor 25 so that the voltage on wire 27 cannot reach the level of the (B+) voltage source. The noise eliminator 28 does not, under these circumstances, then receive its required large amplitude of positive-going trigger pulse.

As previously described, each amplifier channel normally provides only one negative-going trigger pulse for each application and each removal of a code pulse from the track rails. Under certain circumstances, however, more than one negative-going trigger pulse may be provided. If the multiple pulses are in time coincidence from the two amplifying channels, the coincidence detector 17 will provide separate positive-going trigger pulses for each, and these will all be applied to the input circuit of the noise eliminator 28. The noise eliminator is so organized, however, that it provides only a single output pulse to the decoding apparatus 32 for each transient voltage induced in the receiver coils, regardless of whether one or a plurality of pulses occur at the noise eliminator input for each such transient. The noise eliminator 28 comprises essentially a timing circuit means whose timing operation is initiated by each positive-going pulse appearing on wire 27, but provides an output pulse on wire 29 only upon the initiation of its timing condition. At the end of its predetermined timing interval, the noise eliminator restores itself to its normal condition so that it can again be set into its timing operation by another pulse on its wire 27. The timing interval selected for the noise eliminator is appreciably less than the interval between successive transients for the highest code rate, but is longer than the successive pulses it receives in response to a single transient. Consequently, the first pulse received by the noise eliminator 28 in response to an induced transient initiates a timing action of the noise eliminator. Any subsequent pulses resulting from this same transient are merely effective to hold the noise eliminator in its timing condition but are not effective to initiate such timing condition because the noise eliminator is prevented by the successively occurring pulses from restoring itself to its normal condition. Consequently, only a single output pulse is produced on wire 29 for each transient. Before the occurrence of the next transient, however, the noise eliminator is restored to its normal condition so that it can again be set into operation by the first-occurring pulse of the next transient and thus produce still another output pulse on wire 29.

The output pulses of the noise eliminator on wire 29 are applied through contacts 30 and 31 of relays 24 and 26 respectively to the decoding apparatus 32. This decoding apparatus may be of the electronic code rate discriminator type previously mentioned which is distinctively controlled according to the rate of the pulses appearing on wire 29 and is effective to selectively energize the cab signals diagrammatically illustrated so that the proper signal indication will be displayed to the trainman.

The coincidence detector 17 is organized so as to be fail-safe in the sense that a lack of coincidence of the inputs or a circuit fault will result in the absence of any input to the decoding apparatus 32. As already explained, a lack of coincidence of the inputs to tubes 19 and 20 makes it impossible for a positive-going trigger pulse of high amplitude to appear on wire 27. A failure such as the opening or short-circuiting of the connection from an amplifier channel to the associated grid of tube 19 or tube 20 results in inability to drive the grid of that tube to cutoff so that again the required trigger pulse cannot appear on wire 27. A burning out of either tube 19 or tube 20, or any opening of the plate-cathode circuit of either tube makes it impossible for the corresponding relay 24 or 26 to be maintained steadily energized. In that event, the respective contact 30 and 31 is opened so that the output pulses of the noise eliminator 28 cannot be applied to the decoding apparatus 32. Thus, only when the coincidence detector 17 is in its proper operating condition, with both tubes normally conductive and both able to be cut off by a negative-going pulse from its respective channel amplifier, and only if such pulses are simultaneously received from both tubes, can input pulses be received by the decoding apparatus 32.

The coincidence detector shown in the drawing can easily be extended to detect coincidence among more than two input pulses. This is simply done by providing an additional, normally conductive electron tube for each additional input pulse. The plate of each tube is then connected through the winding of an associated relay to the left-hand terminal of resistor 25. The output circuit then includes a front contact of each such plate relay in series with the contacts 30 and 31 shown in the drawing.

Even though the coincidence detector of this invention may include a number of tubes to detect coincidence among a corresponding number of input pulses, the failure of even one tube to be driven to cutoff results in the production of an output pulse that is only a fraction of the amplitude of pulse provided when all tubes are simultaneously cut off. Each of the tubes of the coincidence detector may be considered as a normally closed switch, connecting the left-hand terminal of resistor 25, through a relatively low impedance, to ground. Whether only one or all of the coincidence tubes is conductive, there then exists an impedance between the left-hand terminal of resistor 25 and ground that is very low as compared to the fixed, high value of resistance provided by resistor 25. Consequently, the voltage on wire 27 is at a low value. It is only when all the coincidence tubes are simultaneously nonconductive, thereby in effect, opening all the switches, that the voltage on wire 27 rises substantially to that provided by the (B+) source.

In the drawing, the relay associated with each tube is shown as being connected between the plate of the tube and the (B+) source. The relay could, of course, instead be connected between cathode and ground of the corresponding tube.

Having described an improved coincidence detecting circuit organization for a cab signaling system as one embodiment of this invention, we desire it to be understood that various other forms and modifications may be used to meet the requirements of practice without in any manner departing from the spirit and scope of this invention.

What we claim is:

1. Rail pulse coincidence detecting means included in train-carried equipment for a cab signaling system responsive to track code pulses applied to the track rails of track sections at selected rates in accordance with traffic conditions, said train-carried equipment comprising a pair of receiver coils each positioned in an inductive relationship with respect to an associated track rail and each having induced therein a distinctive transient voltage by the application and removal of each track code pulse, said train-carried equipment also including separate amplifier means associated with each receiver coil and being effective to provide an output for each transient voltage induced in the associated receiver coil; said coincidence detecting circuit means including, a normally conducting electron tube for each of said amplifier means having its plate-cathode current controlled by the output of the associated amplifier, a load impedance, said tubes having a portion of their plate-cathode circuits in common and having said common portion including said load impedance, relay circuit means including a two-position relay associated with each tube and being energized by the plate-cathode current of said tube, decoding circuit means, the voltage change occurring across said common load impedance when both said tubes simultaneously have their plate-cathode currents varied being applied to said decoding means as an input, said relay circuit means acting to prevent said decoding means from receiving said input unless said relays are all in their picked-up conditions, said decoding means being differently responsive to each of said code rates, said train-carried equipment also including signaling means governed by said decoding means to provide a distinctive indication for each of said code rates.

2. Rail pulse coincidence detecting means included in train-carried equipment for a cab signaling system responsive to track code pulses applied to the rails of track sections at selected rates in accordance with traffic conditions, said train-carried equipment comprising, a receiver coil associated with each track rail and positioned in an inductive relationship with respect to said rail with each receiver coil having induced therein a distinctive transient voltage by the application and removal of each track code pulse, said train-carried equipment also including separate amplifier means associated with each receiver coil and being effective to provide an output voltage pulse for each transient voltage induced in the associated receiver; said coincidence detecting circuit means including, a normally conducting electron tube associated with each amplifier and being rendered momentarily nonconductive by the output from the respective amplifier, said tubes having a portion of their plate-cathode circuits in common and with said common portion including a load impedance, decoding circuit means responsive to the change in voltage appearing across said load impedance when both said tubes are simultaneously made nonconductive, separate relay circuit means associated with each tube and being maintained steadily energized by the normal plate-cathode current of said tube, and circuit means governed by said relay means for each tube to permit the change in voltage across said common load impedance to be applied to said decoding circuit means only when each said relay circuit means is energized, said decoding means being differently responsive to each of said code rates; said train-carried equipment also including signaling apparatus governed by said decoding means to provide a distinctive indication for each of said code rates.

3. A pulse coincidence detector responsive to a plurality of input pulses each from a respective source comprising, a plurality of electron tubes one for each of said sources, each of said tubes being normally in a conductive condition but being made momentarily nonconductive by the respective input pulse, a plate-cathode circuit for each tube including a winding of an electromagnetic relay, said tubes having a portion of their plate-cathode circuits in common and with said common portion including a load impedance, pulse responsive circuit means responsive only to the large amplitude voltage pulse produced across said load impedance when all said tubes are simultaneously made nonconductive, relay circuit means including contacts of said relays preventing the pulses produced across said load impedance from being applied to said pulse responsive circuit means unless all said relays are energized.

4. A pulse coincidence detection circuit organization comprising, a plurality of unidirectional input pulses each from a respective source, an electron discharge device for each of said sources biased to a normally conductive condition and becoming cut off by the pulse received from the respective source, a circuit for each of said discharge devices including in series in the conductive path of said device the winding of an electromagnetic relay and a portion common to all said discharge devices including a common load resistor, circuit means responsive to the change in voltage appearing across said load resistor when all said discharge devices are simultaneously driven to cutoff, and means governed by said relay associated with each discharge device for applying said change in voltage to said circuit means only when all said discharge devices are normally in their conductive conditions and effective to hold the respective relay steadily energized, whereby said circuit is energized by said voltage change only when said pulses from all the respective sources occur simultaneously.

References Cited in the file of this patent

UNITED STATES PATENTS

| | | |
|---|---|---|
| Re. 23,790 | Strother | Feb. 23, 1954 |
| 1,718,528 | Clark et al. | June 25, 1929 |
| 2,131,735 | Hoppe | Oct. 4, 1938 |
| 2,349,987 | Place | May 30, 1944 |
| 2,731,553 | Zaffarano et al. | Jan. 17, 1956 |